(12) United States Patent
Mamrak et al.

(10) Patent No.: US 11,524,451 B2
(45) Date of Patent: Dec. 13, 2022

(54) ADDITIVE MANUFACTURING APPARATUS HAVING A STABILIZED BUILD PLATFORM AND METHODS OF ITS USE

(71) Applicant: General Electric Company, Schenectady, NY (US)

(72) Inventors: Justin Mamrak, Loveland, OH (US); MacKenzie Ryan Redding, Mason, OH (US)

(73) Assignee: General Electric Company, Schenectady, NY (US)

( * ) Notice: Subject to any disclaimer, the term of this patent is extended or adjusted under 35 U.S.C. 154(b) by 102 days.

(21) Appl. No.: 16/761,756

(22) PCT Filed: Nov. 2, 2018

(86) PCT No.: PCT/US2018/058875
§ 371 (c)(1),
(2) Date: May 5, 2020

(87) PCT Pub. No.: WO2019/094281
PCT Pub. Date: May 16, 2019

(65) Prior Publication Data
US 2020/0262138 A1    Aug. 20, 2020

Related U.S. Application Data (60) Provisional application No. 62/584,175, filed on Nov. 10, 2017.

(51) Int. Cl.
*B29C 64/153* (2017.01)
*B29C 64/232* (2017.01)
(Continued)

(52) U.S. Cl.
CPC .......... *B29C 64/153* (2017.08); *B29C 64/232* (2017.08); *B29C 64/236* (2017.08);
(Continued)

(58) Field of Classification Search
None
See application file for complete search history.

(56) References Cited

U.S. PATENT DOCUMENTS

| 5,641,422 A | 6/1997 | Matsen et al. |
| 5,710,414 A | 1/1998 | Matsen et al. |

(Continued)

FOREIGN PATENT DOCUMENTS

| CN | 105127422 A | 12/2015 |
| CN | 105904736 A | 8/2016 |

(Continued)

OTHER PUBLICATIONS

PCT International Search Report Corresponding to PCT/US2018/058875 dated Feb. 19, 2019.

*Primary Examiner* — Kelly M Gambetta
*Assistant Examiner* — Virak Nguon
(74) *Attorney, Agent, or Firm* — Dority & Manning, P.A.

(57) ABSTRACT

An additive manufacturing apparatus is provided. The additive manufacturing apparatus may include a stabilizing system; a build platform on the stabilizing system; and a build unit positioned over the build platform, wherein the build unit comprises a powder dispenser and a recoater blade. Methods are also provided for making an object from powder.

20 Claims, 7 Drawing Sheets

(51) Int. Cl.
    *B29C 64/245*    (2017.01)
    *B29C 64/236*    (2017.01)
    *B29C 64/25*     (2017.01)
    *B33Y 10/00*     (2015.01)
    *B33Y 30/00*     (2015.01)
    *B29C 64/268*    (2017.01)

(52) U.S. Cl.
    CPC ............ *B29C 64/245* (2017.08); *B29C 64/25* (2017.08); *B29C 64/268* (2017.08); *B33Y 10/00* (2014.12); *B33Y 30/00* (2014.12)

(56) References Cited

U.S. PATENT DOCUMENTS

| | | | |
|---|---|---|---|
| 9,505,173 B2 | 11/2016 | Maggiore | |
| 9,597,730 B2 | 3/2017 | Mironets et al. | |
| 9,597,731 B2 | 3/2017 | Volk | |
| 2014/0271965 A1* | 9/2014 | Ferrar | B23K 26/342 |
| | | | 425/163 |
| 2014/0302188 A1 | 10/2014 | Rix et al. | |
| 2015/0192919 A1 | 7/2015 | Sketch et al. | |
| 2016/0311021 A1* | 10/2016 | Elfstroem | B29C 64/153 |
| 2017/0246804 A1 | 8/2017 | El-Siblani et al. | |
| 2017/0266890 A1 | 9/2017 | Volk | |
| 2018/0071977 A1 | 3/2018 | Tumbleston et al. | |

FOREIGN PATENT DOCUMENTS

| | | |
|---|---|---|
| DE | 102014004870 A1 | 10/2015 |
| EP | 3366460 A1 | 8/2018 |
| WO | WO2016/149104 A1 | 9/2016 |
| WO | WO2017/051029 A1 | 3/2017 |

\* cited by examiner

ADDITIVE MANUFACTURING APPARATUS HAVING A STABILIZED BUILD PLATFORM AND METHODS OF ITS USE

PRIORITY INFORMATION

The present application claims priority to U.S. Provisional Patent Application Ser. No. 62/584,175 filed on Nov. 10, 2017, which is incorporated by reference herein.

FIELD

The present disclosure generally relates to methods and systems adapted to perform additive manufacturing ("AM") processes, for example by direct melt laser manufacturing ("DMLM"), on a larger scale format.

BACKGROUND

Additive manufacturing ("AM") processes generally involve the buildup of one or more materials to make a net or near net shape (NNS) object, in contrast to subtractive manufacturing methods. Though "additive manufacturing" is an industry standard term (ISO/ASTM52900), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses an irradiation emission directing device that directs an energy beam, for example, an electron beam or a laser beam, to sinter or melt a powder material, creating a solid three-dimensional object in which particles of the powder material are bonded together. Different material systems, for example, engineering plastics, thermoplastic elastomers, metals, and ceramics are in use. Laser sintering or melting is a notable AM process for rapid fabrication of functional prototypes and tools. Applications include direct manufacturing of complex workpieces, patterns for investment casting, metal molds for injection molding and die casting, and molds and cores for sand casting. Fabrication of prototype objects to enhance communication and testing of concepts during the design cycle are other common usages of AM processes.

Selective laser sintering, direct laser sintering, selective laser melting, and direct laser melting are common industry terms used to refer to producing three-dimensional (3D) objects by using a laser beam to sinter or melt a fine powder. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

During direct metal laser sintering ("DMLS") or direct metal laser melting (DMLM), an apparatus builds objects in a layer-by-layer manner by sintering or melting a powder material using an energy beam. The powder to be melted by the energy beam is spread evenly over a powder bed on a build platform, and the energy beam sinters or melts a cross sectional layer of the object being built under control of an irradiation emission directing device. The build platform is lowered and another layer of powder is spread over the powder bed and object being built, followed by successive melting/sintering of the powder. The process is repeated until the part is completely built up from the melted/sintered powder material.

After fabrication of the part is complete, various post-processing procedures may be applied to the part. Post processing procedures include removal of excess powder by, for example, blowing or vacuuming. Other post processing procedures include a stress release process. Additionally, thermal and chemical post processing procedures can be used to finish the part.

In conventional systems, the walls of the powder bed define the amount of powder needed to make a part. The weight of the powder within the build environment is one limitation on the size of parts being built in this type of apparatus. The amount of powder needed to make a large part may exceed the limits of the build platform or make it difficult to control the lowering of the build platform by precise steps which is needed to make highly uniform additive layers in the object being built.

As such, there remains a need for an improved large format powder manufacturing system, along with methods of its use.

BRIEF DESCRIPTION

Aspects and advantages will be set forth in part in the following description, or may be obvious from the description, or may be learned through practice of the invention.

An additive manufacturing apparatus is generally provided. In one embodiment, the additive manufacturing apparatus includes a stabilizing system; a build platform on the stabilizing system; and a build unit positioned over the build platform, wherein the build unit comprises a powder dispenser and a recoater blade.

Methods are also generally provided for making an object from powder. In one embodiment, the method includes (a) applying a layer of powder on a build platform that is positioned on a stabilizing system; (b) bonding at least part of a layer of powder to form a portion of an object; (c) moving at least one of the build platform downward or the build unit upward in a direction substantially normal to the layer of powder; and (d) repeating at least steps (a) through (c) to form the object.

These and other features, aspects and advantages will become better understood with reference to the following description and appended claims. The accompanying drawings, which are incorporated in and constitute a part of this specification, illustrate embodiments of the invention and, together with the description, serve to explain certain principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Repeat use of reference characters in the present specification and drawings is intended to represent the same or analogous features or elements of the present invention.

DETAILED DESCRIPTION OF PARTICULAR EMBODIMENTS

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Methods and apparatus are generally provided for additive manufacturing objects on a stabilized build platform. In one embodiment, the build platform is stabilized from its environment so as to isolate the build platform from vibrations and other undesirable movements that could affect the precision of the build. Such a stabilized build platform is particularly suitable for use with an additive manufacturing apparatus having a stationary build platform with a build unit moveable in at least three dimensions during operation.

As such, an apparatus is provided that can be used to perform additive manufacturing, as well as methods for utilizing the apparatus to additively manufacture objects. The apparatus includes components that make it particularly useful for making large additively manufactured objects through management of the build platform. In one particular embodiment, a build platform may be stabilized and/or isolated from vibrations and other movements in the environment on which it is mounted.

Figure 1:
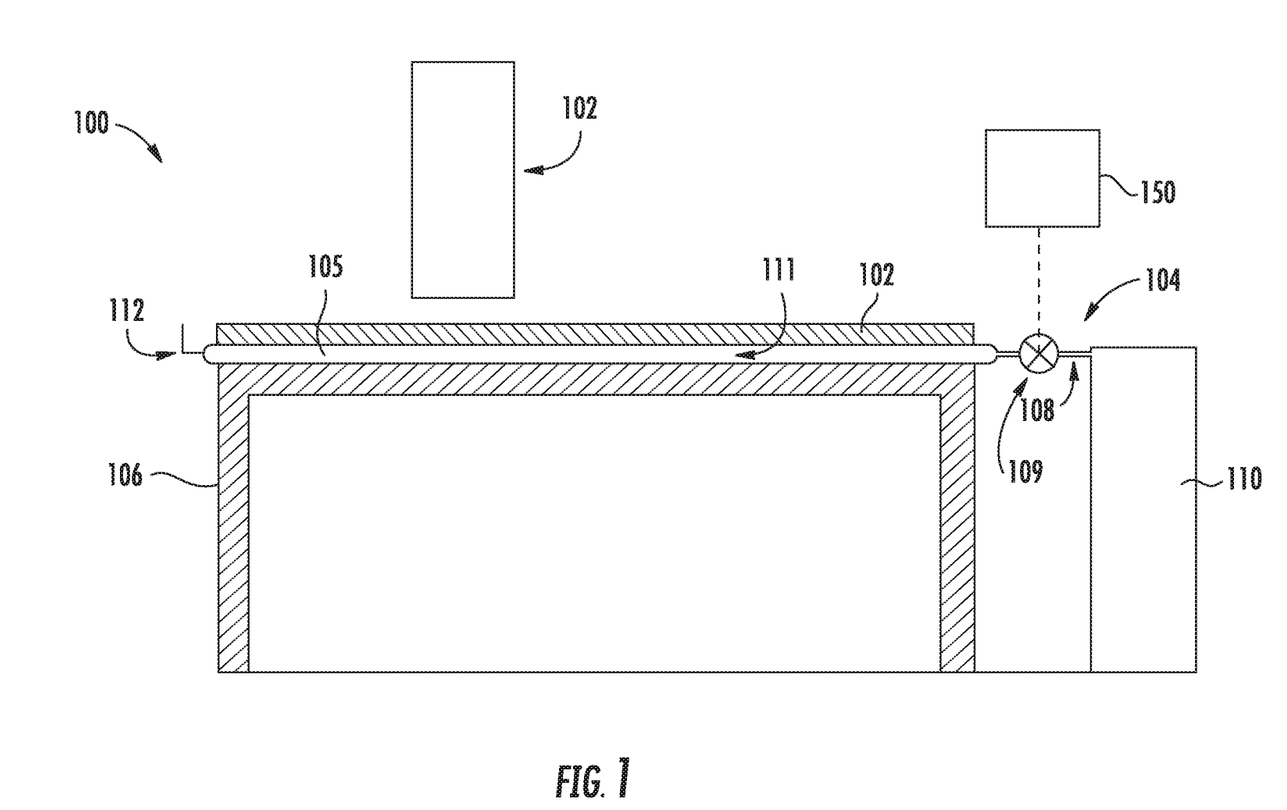
FIG. 1 shows an additive manufacturing apparatus that includes a stabilizing system according to an embodiment of the invention.

Referring to FIG. 1, an exemplary additive manufacturing apparatus 100 is generally shown including a build platform 102 on a stabilization system 104. The stabilization system 104 is shown over a machine frame 106, although any suitable support may be utilized as a base for the stabilization system 104. As shown, the stabilization system 104 isolates the build platform 102 from its environment, particularly its mounting base (shown as machine frame 106) so as to reduce and/or eliminate vibrations and other movement that would otherwise be transmitted to the build platform 102 through the machine frame 106.

In one embodiment, the stabilization system includes at least one bladder 105. Generally, the bladder 105 may be configured to receive a fluid 111 therein, such as through the piping 108 connected to the fluid source 110. The flow of the fluid 111 through the piping 108, and thus into and/or out of the bladder 105, may be regulated through an actuating mechanism 109 (e.g., a valve). As such, the fluid pressure within the bladder 105 may be regulated. Optionally, a vent 112 may be included on the bladder 105, which may be passively or actively controlled to regulate the flow of the fluid out of the bladder 105. In certain embodiments, a control system 150 may be utilized to regulate the flow of the fluid into and/or out of the bladder 105, such as via control of the actuating mechanism 109.

Figure 2A:
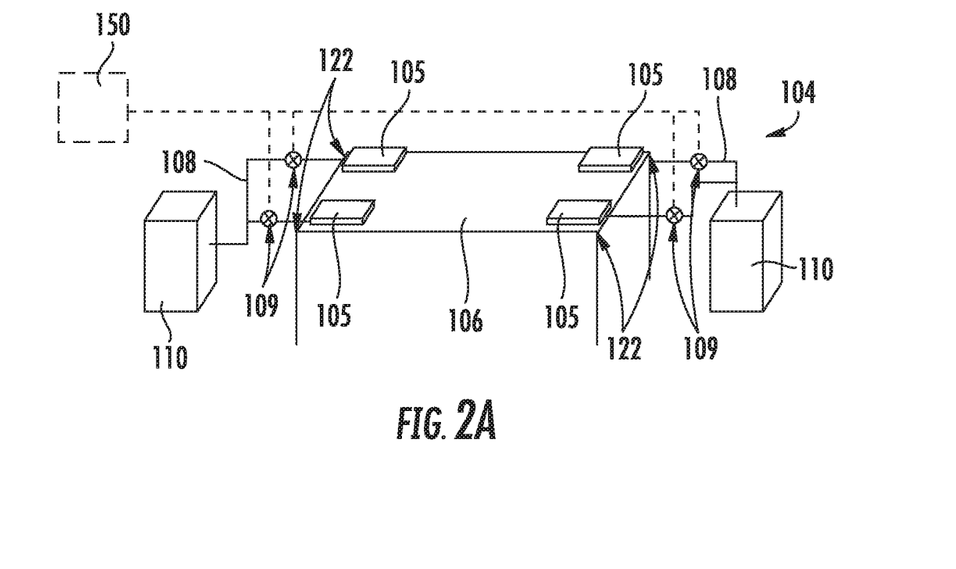
FIG. 2A shows an exemplary stabilizing system for use with an additive manufacturing apparatus according to one embodiment.
Figure 2B:
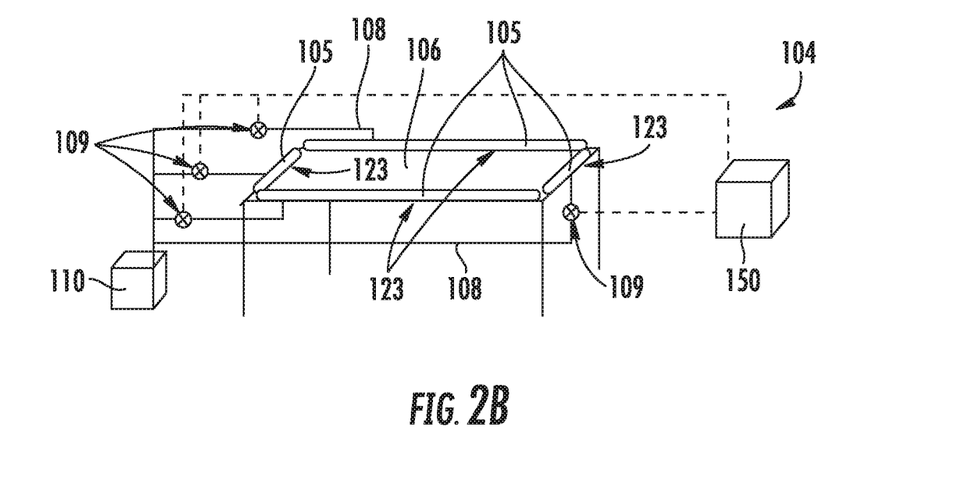
FIG. 2B shows another exemplary stabilizing system for use with an additive manufacturing apparatus according to one embodiment.

Although shown as a single bladder 105 in FIG. 1, it is to be understood that any number of bladders may be utilized within the stabilizing system 104. For example, referring to FIGS. 2A and 2B, a plurality of bladders 105 are shown within the stabilizing system 104. As shown in FIGS. 2A and 2B, a rectangular machine frame 106 is shown with four bladders 105 positioned thereon. The embodiment of FIG. 2A shows four bladders 105, one positioned on each of the four corners 122 of the machine frame 106. Alternatively, embodiment of FIG. 2B shows four bladders 105, one positioned on each of the four sides 123 of the machine frame 106. In other embodiments, any desired number of bladders 105 may be utilized. Likewise, the bladders 105 may be arranged as desired between the machine frame 106 and the build platform 102.

Figure 3:
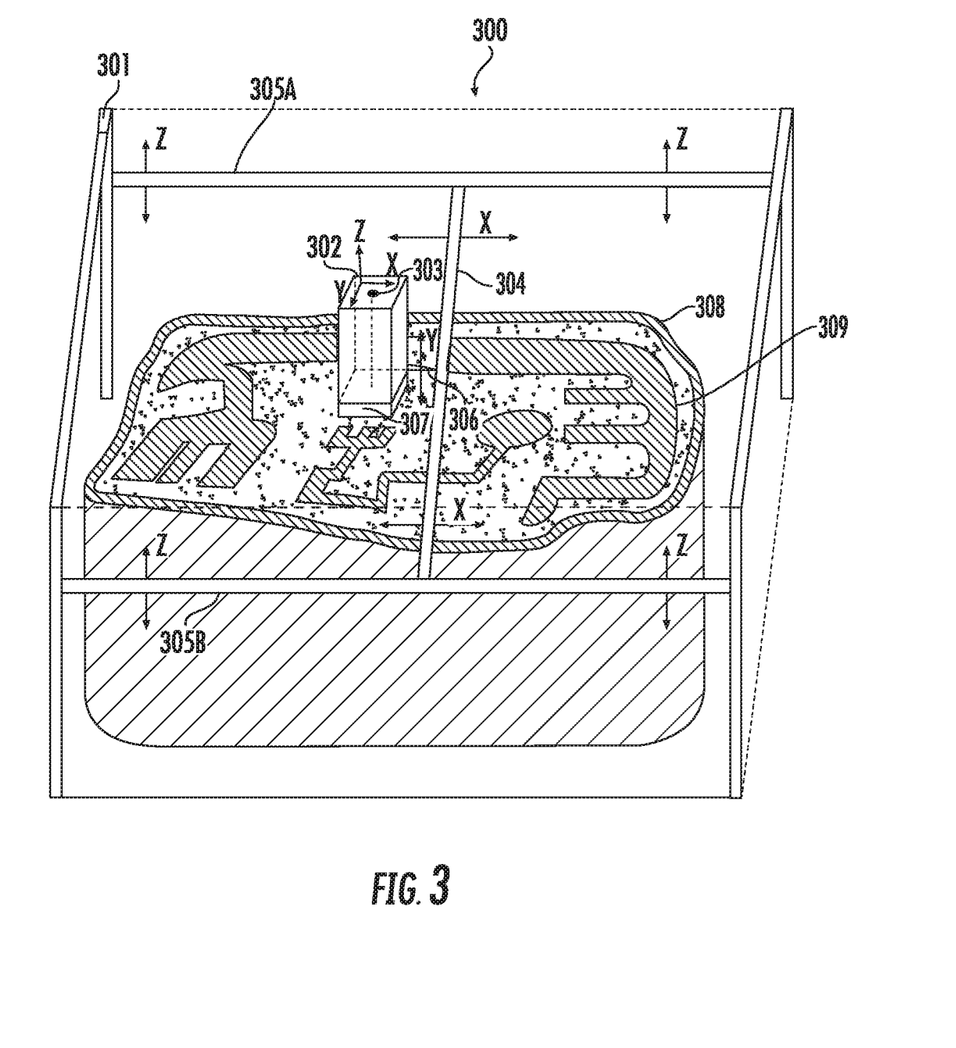
FIG. 3 shows a large scale additive manufacturing apparatus according to an embodiment of the invention.
Figure 4:
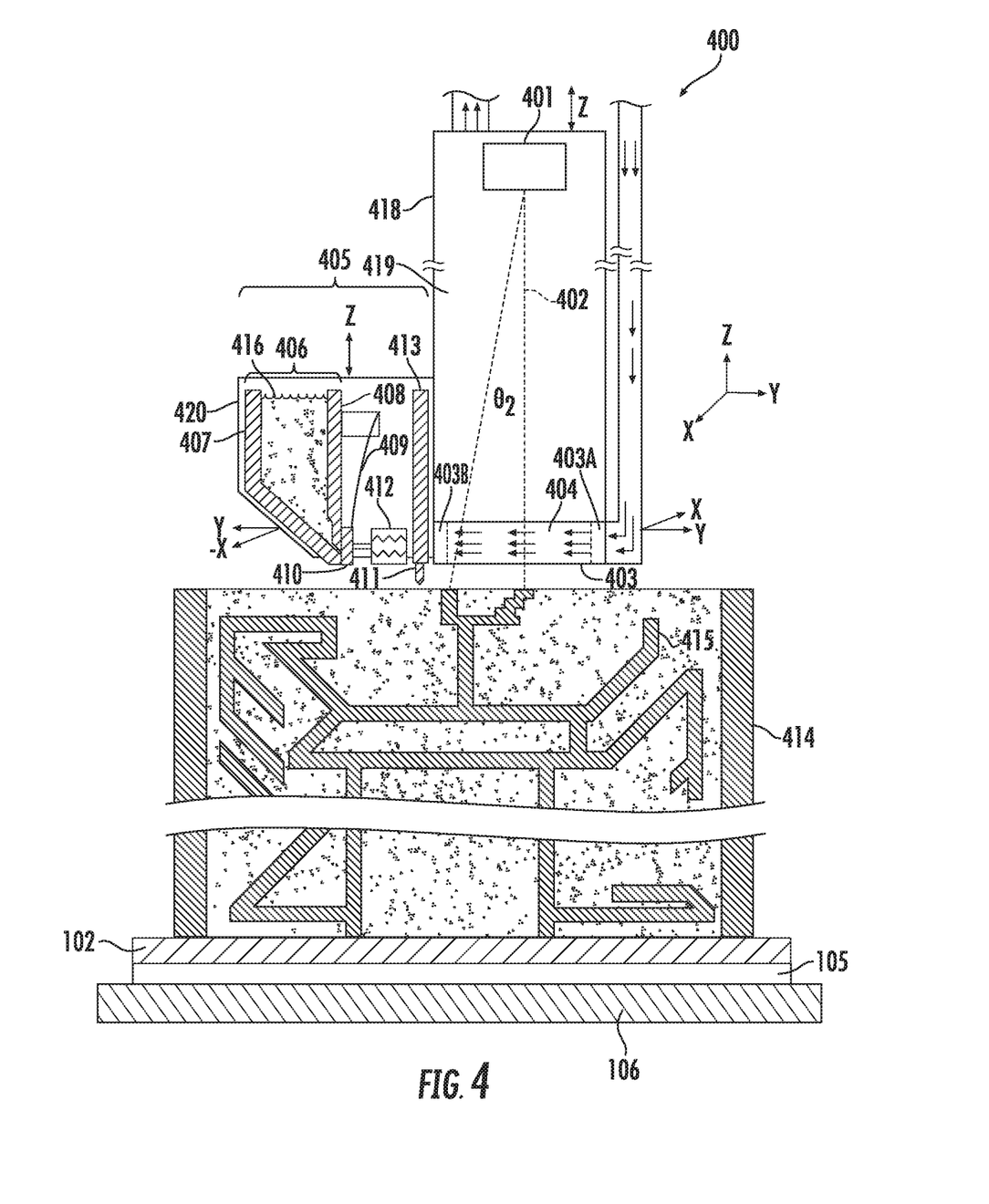
FIG. 4 shows a side view of a build unit according to an embodiment of the invention.
Figure 5:
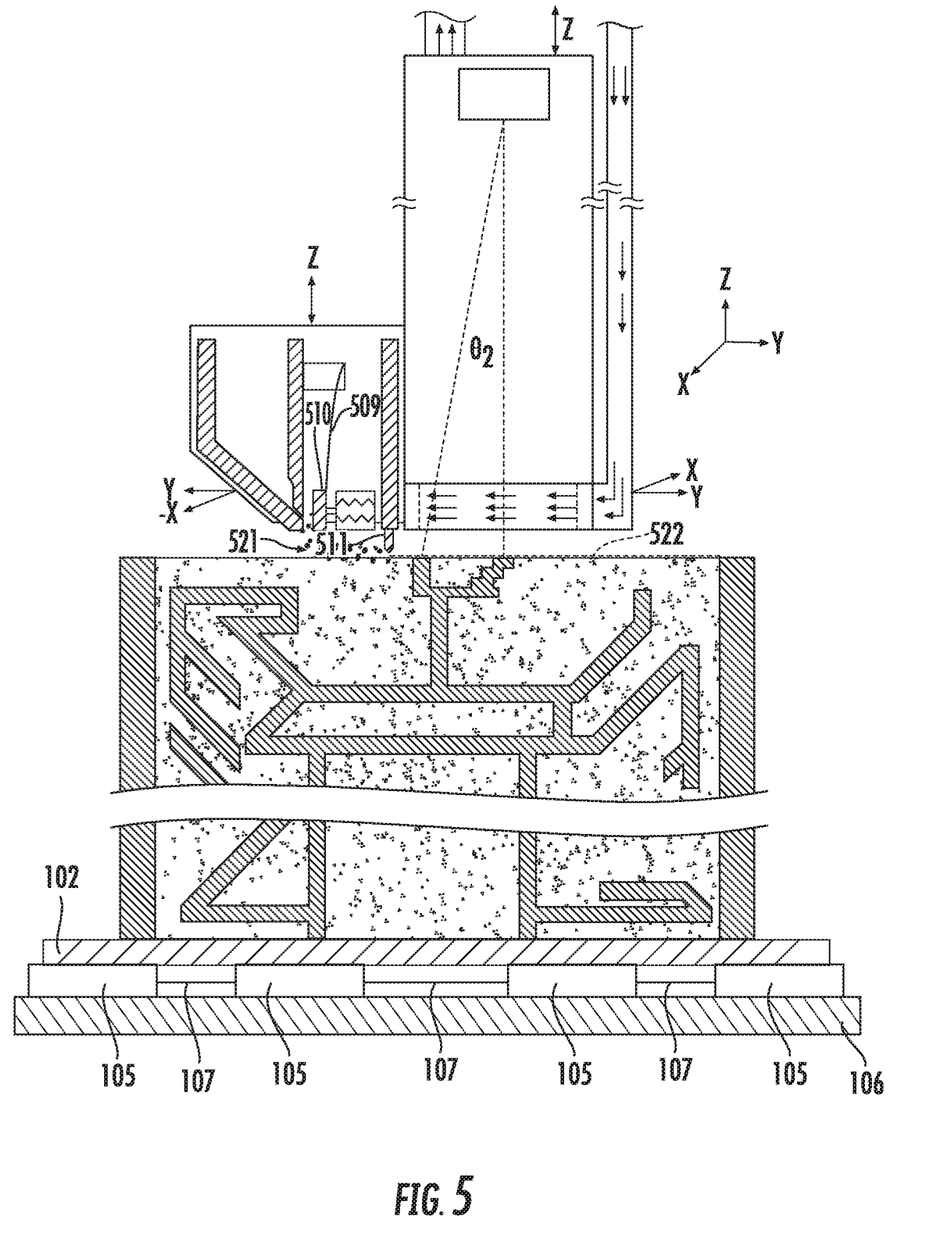
FIG. 5 shows a side view of a build unit dispensing powder according to an embodiment of the invention.

The embodiments shown in FIGS. 2A and 2B are particularly suitable for use with a rectangular build platform 102. In one embodiment, the planar dimensions of the machine frame 106 and the build platform 102 are substantially the same. However, in other embodiments, the machine frame 106 and the build platform 102 may have another shape (e.g., oval, circular, etc.). In particular embodiments, the machine frame is stationary, in that it remains in place in each of its x-, y-, and z-directions (FIGS. 3-5). In such embodiments, the only movement applied to the build platform 102 is the small adjustments made via the stabilization system 104.

Referring to the embodiments of FIGS. 2A and 2B, multiple bladders 105 may be present in the stabilization system 104 with fluid flow into and out of each of the bladders 105 being independently controlled, such as through a series of piping 108, actuating mechanisms 109 (e.g., valves or optional vents 112, as shown in FIG. 1). For example, each bladder 105 may be independently connected to the fluid tanks 110 via an independent actuating mechanism 109. An optional control system 150 may then regulate the flow of fluid into each of the bladders 105 independently from each other. As such, the plurality of bladders 105 may be utilized to level the build platform 102 on the machine frame 106 via active control of each of the bladders 105.

Figure 2C:
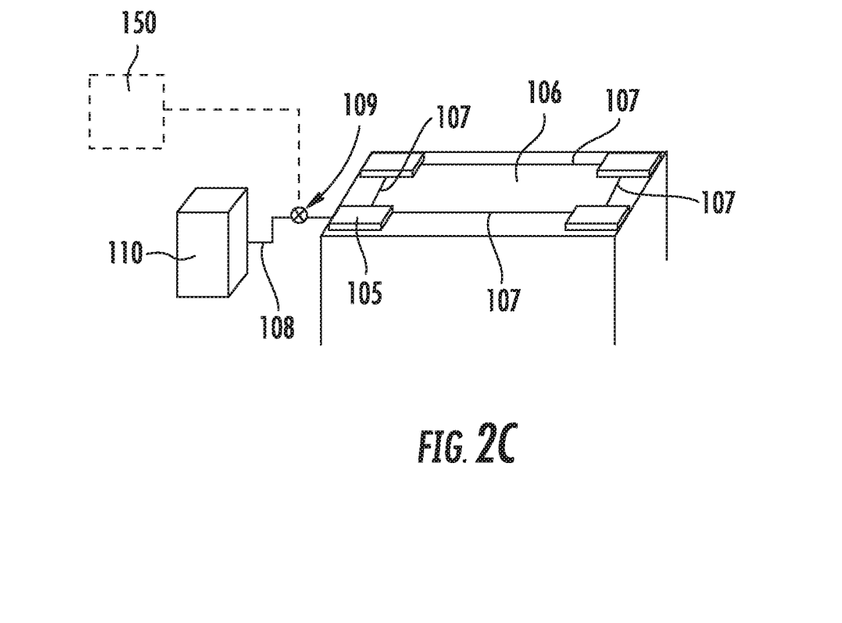
FIG. 2C shows yet another exemplary stabilizing system for use with an additive manufacturing apparatus according to one embodiment.
Figure 2D:
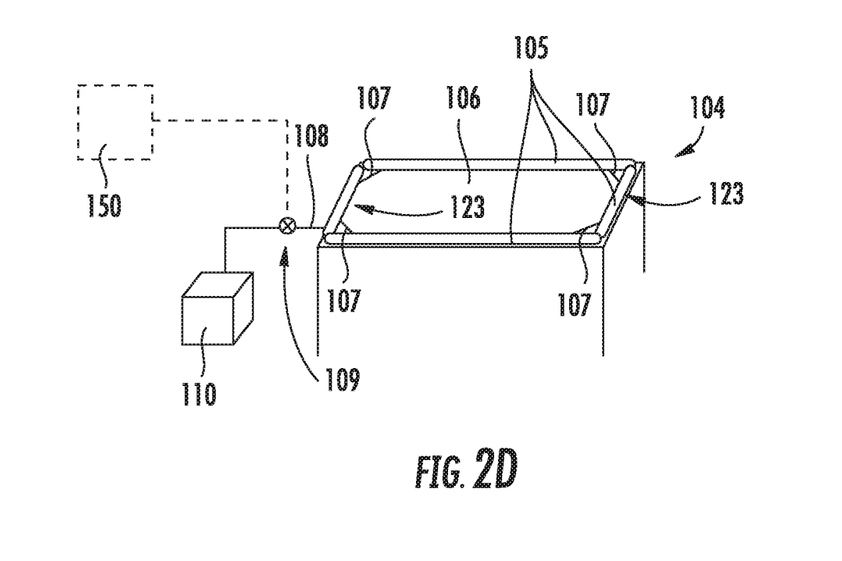
FIG. 2D shows still another exemplary stabilizing system for use with an additive manufacturing apparatus according to one embodiment.
Figure 6:
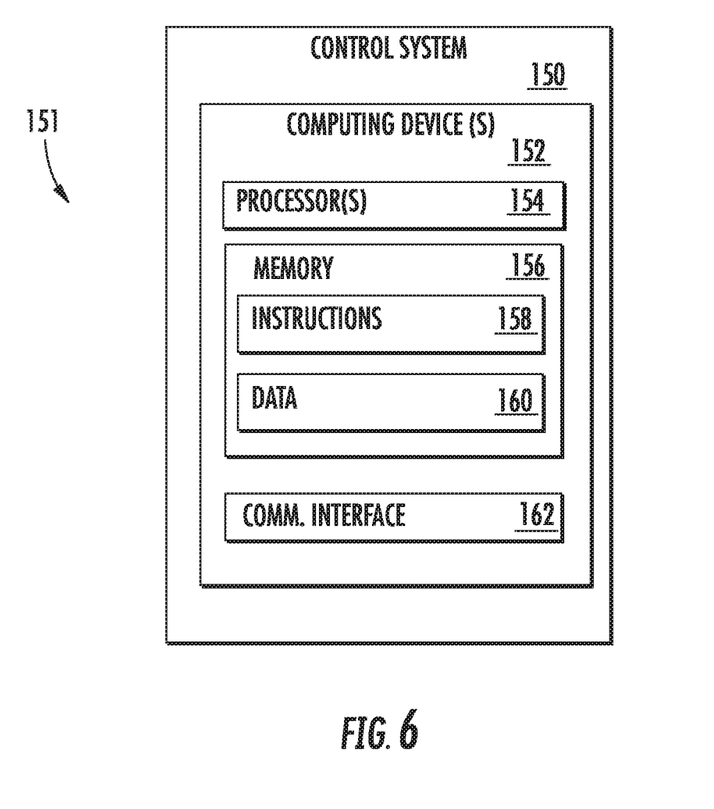
FIG. 6 shows an exemplary control system for use with the system and process of building an object according to an embodiment of the invention.

In the embodiments of FIGS. 2C and 2D, multiple bladders 105 may be present in the stabilization system 104 and arranged in serial fluid communication with each other. Thus, fluid flow into and out of each of the bladders 105 is passively allowed to form an equilibrium within the multiple bladders 105. In the embodiment shown, a pipe 108 with an actuating mechanism 109 (e.g., valves or optional vents 112, as shown in FIG. 1) fluidly connects the series of bladders 105 to the fluid tank 110. An optional control system 150 may then regulate the flow of fluid into the series of the bladders 105. As such, the fluid may flow through the plurality of bladders 105 to level the build platform 102 on the machine frame 106 in a form of a self-leveling system. In one particular embodiment, the fluid may be introduced into the series of bladders 105 to a desired initial pressure without any control system 150, and then allowed to be self-balancing during the build. FIG. 4 shows a similar embodiment having a plurality of bladders 105 serially fluidly connected FIG. 6 depicts a block diagram of an example control system 150 that can be used to implement methods and systems according to example embodiments of the present disclosure, particularly regulation of fluid flow within the stabilization system 104. As shown, the control system 150 can include one or more computing device(s) 152. The one or more computing device(s) 152 can include one or more processor(s) 154 and one or more memory device(s) 156. The one or more processor(s) 154 can include any suitable processing device, such as a microprocessor, microcontroller, integrated circuit, logic device, or other suitable processing device. The one or more memory device(s) 156 can include one or more computer-readable media, including, but not limited to, non-transitory computer-readable media, RAM, ROM, hard drives, flash drives, or other memory devices.

The one or more memory device(s) 156 can store information accessible by the one or more processor(s) 154, including computer-readable instructions 158 that can be executed by the one or more processor(s) 154. The instructions 158 can be any set of instructions that when executed by the one or more processor(s) 154, cause the one or more processor(s) 154 to perform operations. The instructions 158 can be software written in any suitable programming language or can be implemented in hardware. In some embodiments, the instructions 158 can be executed by the one or more processor(s) 154 to cause the one or more processor(s) 154 to perform operations, such as the operations for controlling the flow of fluid into the bladders 105 (e.g., through control of the flow rate through the actuating mechanisms 109).

The memory device(s) 156 can further store data 160 that can be accessed by the one or more processor(s) 154. For example, the data 160 can include any data used for stabilizing input, as described herein. The data 160 can include one or more table(s), function(s), algorithm(s), model(s), equation(s), etc. for stabilizing input according to example embodiments of the present disclosure. The one or more computing device(s) 152 can also include a communication interface 162 used to communicate, for example, with the other components of system. The communication interface 162 can include any suitable components for interfacing with one or more network(s), including, for example, transmitters, receivers, ports, controllers, antennas, or other suitable components (e.g., the actuating mechanisms 109).

The fluid 111 may be any suitable fluid for filling the bladder 105 may be a gas (including compressed gas) or liquid. For example, the fluid may be, but is not limited to, atmospheric air, nitrogen gas, an inert gas (e.g., argon), water, oil, etc. The bladder 105 may be formed from any suitable fluid impermeable materials, such as a rubber film, a plastic film, etc.

Additionally, the apparatus 100 may include a build unit 102 having several components for making high precision, large scale additively manufactured objects, which may include, for example, a recoater, a gasflow device with a gasflow zone, and/or a bonding device (e.g., an irradiation emission directing device, a binder jetting device, etc.). An irradiation emission directing device used in an embodiment of the present invention may be, for example, an optical control unit for directing a laser beam. An optical control unit may comprise, for example, optical lenses, deflectors, mirrors, and/or beam splitters. Advantageously, a telecentric lens may be used. Alternatively, the irradiation emission directing device may be an electronic control unit for directing an e-beam. The electronic control unit may comprise, for example, deflector coils, focusing coils, or similar elements. The build unit 102 may be attached to a positioning system (e.g. a gantry, delta robot, cable robot, robot arm, belt drive, etc.) that allows three dimensional movement throughout a build environment, as well as rotation of the build unit 102 in a way that allows coating of a thin powder layer in any direction desired.

FIG. 3 shows an example of one embodiment of a large-scale additive manufacturing apparatus 300 according to one embodiment of the present invention. The apparatus 300 comprises a positioning system 301, a build unit 302 comprising an irradiation emission directing device 303, a laminar gas flow zone 307, and a build plate (not shown in this view) beneath an object being built 309. The maximum build area is defined by the positioning system 301, instead of by a powder bed as with conventional systems, and the build area for a particular build can be confined to a build envelope 308 that may be dynamically built up along with the object. The gantry 301 has an x crossbeam 304 that moves the build unit 302 in the x direction. There are two z crossbeams 305A and 305B that move the build unit 302 and the x crossbeam 304 in the z direction. The x cross beam 304 and the build unit 302 are attached by a mechanism 306 that moves the build unit 302 in the y direction. In this illustration of one embodiment of the invention, the positioning system 301 is a gantry, but the present invention is not limited to using a gantry. In general, the positioning system used in the present invention may be any multidimensional positioning system such as a delta robot, cable robot, robot arm, etc. The irradiation emission directing device 303 may be independently moved inside of the build unit 302 by a second positioning system (not shown). The atmospheric environment outside the build unit, i.e. the "build environment," or "containment zone," is typically controlled such that the oxygen content is reduced relative to typical ambient air, and so that the environment is at reduced pressure.

There may also be an irradiation source that, in the case of a laser source, originates the photons comprising the laser beam irradiation is directed by the irradiation emission directing device. When the irradiation source is a laser source, then the irradiation emission directing device may be, for example, a galvo scanner, and the laser source may be located outside the build environment. Under these circumstances, the laser irradiation may be transported to the irradiation emission directing device by any suitable means, for example, a fiber-optic cable. When the irradiation source is an electron source, then the electron source originates the electrons that comprise the e-beam that is directed by the irradiation emission directing device. When the irradiation source is an electron source, then the irradiation emission directing device may be, for example, a deflecting coil. When a large-scale additive manufacturing apparatus according to an embodiment of the present invention is in operation, if the irradiation emission directing devices directs a laser beam, then generally it is advantageous to include a gasflow device providing substantially laminar gas flow to a gasflow zone as illustrated in FIG. 1, 307 and FIG. 2, 404. If an e-beam is desired, then no gasflow is provided. An e-beam is a well-known source of irradiation. When the source is an electron source, then it is important to maintain sufficient vacuum in the space through which the e-beam passes. Therefore, for an e-beam, there is no gas flow across the gasflow zone (shown, for example at FIG. 1, 307).

The apparatus 300 allows for a maximum angle of the beam to be a relatively small angle $\Theta_2$ to build a large part, because (as illustrated in FIG. 1) the build unit 302 can be moved to a new location to build a new part of the object being formed 309. When the build unit is stationary, the point on the powder that the energy beam touches when $\Theta_2$ is 0 defines the center of a circle in the xy plane (the direction of the beam when $\Theta_2$ is approximately 0 defines the z direction), and the most distant point from the center of the circle where the energy beam touches the powder defines a point on the outer perimeter of the circle. This circle defines the beam's scan area, which may be smaller than the smallest cross sectional area of the object being formed (in the same plane as the beam's scan area). There is no particular upper limit on the size of the object relative to the beam's scan area.

In some embodiments, the recoater used is a selective recoater. One embodiment is illustrated in FIGS. 4 and 5. FIG. 4 shows a build unit 400 comprising an irradiation emission directing device 401, a gasflow device 403 with a pressurized outlet portion 403A and a vacuum inlet portion 403B providing gas flow to a gasflow zone 404, and a recoater 405. Above the gasflow zone 404 there is an enclosure 418 containing an inert environment 419. The recoater 405 has a hopper 406 comprising a back plate 407 and a front plate 408. The recoater 405 also has at least one actuating element 409, at least one gate plate 410, a recoater blade 411, an actuator 412, and a recoater arm 413. The recoater is mounted to a mounting plate 420. FIG. 4 also shows a build envelope 414 that may be built by, for example, additive manufacturing or Mig/Tig welding, an object being formed 415, and powder 416 contained in the hopper 405 used to form the object 415. In this particular embodiment, the actuator 412 activates the actuating element 409 to pull the gate plate 410 away from the front plate 408. In an embodiment, the actuator 412 may be, for example, a pneumatic actuator, and the actuating element 409 may be a bidirectional valve. In an embodiment, the actuator 412 may be, for example, a voice coil, and the actuating element 409 may be a spring. There is also a hopper gap 417 between the front plate 408 and the back plate 407 that allows powder to flow when a corresponding gate plate is pulled away from the powder gate by an actuating element. The powder 416, the back plate 407, the front plate 408, and the gate plate 410 may all be the same material. Alternatively, the back plate 407, the front plate 408, and the gate plate 410 may all be the same material, and that material may be one that is compatible with the powder material, such as cobalt-chrome. In this particular embodiment, the gas flow in the gasflow zone 404 flows in the y direction, but it does not have to. The recoater blade 411 has a width in the x direction. The direction of the irradiation emission beam when $\Theta_2$ is approximately 0 defines the z direction in this view. The gas flow in the gasflow zone 404 may be substantially laminar. The irradiation emission directing device 401 may be independently movable by a second positioning system (not shown). FIG. 4 shows the gate plate 410 in the closed position.

FIG. 5 shows the build unit of FIG. 4, with the gate plate 410 in the open position (as shown by element 510) and actuating element 509. Powder in the hopper is deposited to make fresh powder layer 521, which is smoothed over by the recoater blade 511 to make a substantially even powder layer 522. In some embodiments, the substantially even powder layer may be irradiated at the same time that the build unit is moving, which would allow for continuous operation of the build unit and thus faster production of the object.

In addition, an apparatus according to an embodiment of the present invention may have a controlled low oxygen build environment with two or more gas zones to facilitate a low oxygen environment. The first gas zone is positioned immediately over the work surface. The second gas zone may be positioned above the first gas zone, and may be isolated from the larger build environment by an enclosure. For example, in FIG. 4 element 404 constitutes the first gas zone, element 419 constitutes the second gas zone contained by the enclosure 418, and the environment around the entire apparatus is the controlled low oxygen build environment. In the embodiment illustrated in FIG. 4, the first gasflow zone 404 is essentially the inner volume of the gasflow device 403, i.e. the volume defined by the vertical (xz plane) surfaces of the inlet and outlet portions (403A and 403B), and by extending imaginary surfaces from the respective upper and lower edges of the inlet portion to the upper and lower edges of the outlet portion in the xy plane. When the irradiation emission directing device directs a laser beam, then the gasflow device preferably provides substantially laminar gas flow across the first gas zone. This facilitates removal of the effluent plume caused by laser melting. Accordingly, when a layer of powder is irradiated, smoke, condensates, and other impurities flow into the first gasflow zone, and are transferred away from the powder and the object being formed by the laminar gas flow. The smoke, condensates, and other impurities flow into the low-pressure gas outlet portion and are eventually collected in a filter, such as a HEPA filter. By maintaining laminar flow, the aforementioned smoke, condensates and other impurities can be efficiently removed while also rapidly cooling melt pool(s) created by the laser, without disturbing the powder layer, resulting in higher quality parts with improved metallurgical characteristics. In an aspect, the gas flow in the gasflow volume is at about 3 meters per second. The gas may flow in either the x or y direction.

The oxygen content of the second controlled atmospheric environment is generally approximately equal to the oxygen content of the first controlled atmospheric environment, although it doesn't have to be. The oxygen content of both controlled atmospheric environments is preferably relatively low. For example, it may be 1% or less, or more preferably 0.5% or less, or still more preferably 0.1% or less. The non-oxygen gases may be any suitable gas for the process. For instance, nitrogen obtained by separating ambient air may be a convenient option for some applications. Some applications may use other gases such as helium, neon, or argon. An advantage of the invention is that it is much easier to maintain a low-oxygen environment in the relatively small volume of the first and second controlled atmospheric environments. In prior art systems and methods, the larger environment around the entire apparatus and object must be tightly controlled to have a relatively low oxygen content, for instance 1% or less. This can be time-consuming, expensive, and technically difficult. Thus it is preferable that only relatively smaller volumes require such relatively tight atmospheric control. Therefore, in the present invention, the first and second controlled atmospheric environments may be, for example, 100 times smaller in terms of volume than the build environment. The first gas zone, and likewise the gasflow device, may have a largest xy cross sectional area that is smaller than the smallest cross sectional area of the object. There is no particular upper limit on the size of the object relative to the first gas zone and/or the gasflow device. Advantageously, the irradiation emission beam (illustrated, for example, as 402 and 502) fires through the first and second gas zones, which are relatively low oxygen zones. And when the first gas zone is a laminar gasflow zone with substantially laminar gas flow, the irradiation emission beam is a laser beam with a more clear line of sight to the object, due to the aforementioned efficient removal of smoke, condensates, and other contaminants or impurities.

One advantage of the present invention is that, in some embodiments, the build plate may be vertically stationary (i.e. in the z direction). This permits the build plate to support as much material as necessary, unlike the prior art methods and systems, which require some mechanism to raise and lower the build plate, thus limiting the amount of material that can be used. Accordingly, the apparatus of the present invention is particularly suited for manufacturing an object within a large (e.g., greater than 1 $m^3$) build envelope. For instance, the build envelope may have a smallest xy cross sectional area greater than 500 $mm^2$, or preferably greater than 750 $mm^2$, or more preferably greater than 1 $m^2$. The size of the build envelope is not particularly limited. For instance, it could have a smallest cross sectional area as large as 100 $m^2$. Likewise, the formed object may have a largest xy cross sectional area that is no less than about 500 $mm^2$, or preferably no less than about 750 $mm^2$, or still more preferably no less than about 1 $m^2$. There is no particular upper limit on the size of the object. For example, the object's smallest xy cross sectional area may be as large as 100 $m^2$. Because the build envelope retains unfused powder about the object, it can be made in a way that minimizes unfused powder (which can potentially be wasted powder) within a particular build, which is particularly advantageous for large builds. When building large objects within a dynamically grown build envelope, it may be advantageous to build the envelope using a different build unit, or even a different build method altogether, than is used for the object. For example, it may be advantageous to have one build unit that directs an e-beam, and another build unit that directs a laser beam. With respect to the build envelope, precision and quality of the envelope may be relatively unimportant, such that rapid build techniques are advantageously used. In general, the build envelope may be built by any suitable means, for instance by Mig or Tig welding, or by laser powder deposition. If the wall is built by additive manufacturing, then a different irradiation emission directing device can be used to build than wall than is used to build the object. This is advantageous because building the wall may be done more quickly with a particular irradiation emission directing device and method, whereas a slower and more accurate directing device and method may be desired to build the object. For example, the wall may be built from a rapidly built using a different material from the object, which may require a different build method. Ways to tune accuracy vs. speed of a build are well known in the art, and are not recited here.

Although shown with a single build unit, the apparatus may include multiple build units working simultaneously. For example, the systems and methods of the present invention may use two or more build units to build one or more object(s). The number of build units, objects, and their respective sizes are only limited by the physical spatial configuration of the apparatus. In general, any number of objects and build envelopes can be built simultaneously using the methods and systems of the present invention.

Advantageously, in some embodiments of the present invention the wall may be built up around the object dynamically, so that its shape follows the shape of the object. A dynamically built chamber wall advantageously results in the chamber wall being built closer to the object, which reduces the size of support structures required, and thus reduces the time required to build the support structures. Further, smaller support structures are more stable and have greater structural integrity, resulting in a more robust process with less failure. In one embodiment, two build envelopes may be built, one concentric within the other, to build objects in the shape of, for example, circles, ovals, and polygons. If the wall is built by welding, then support structures such as buttresses may be advantageously built on the wall as needed, to support overhangs and other outwardly-built features of the object. Therefore, according to an embodiment of the present invention, a dynamically built chamber wall enables object features that would be either impossible or impractical using conventional technology.

This written description uses exemplary embodiments to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. An additive manufacturing apparatus, comprising:
   a stabilizing system;
   a build platform on the stabilizing system; and
   a build unit positioned over the build platform, wherein the build unit comprises a powder dispenser, a recoater blade, and an enclosure comprising an irradiation emission directing device and an inert environment, wherein the inert environment of the enclosure is located above a gas zone, the gas zone being between the enclosure and a work surface.

2. The additive manufacturing apparatus of claim 1, wherein the stabilizing system comprises at least one bladder configured to receive a fluid therein.

3. The additive manufacturing apparatus of claim 1, wherein the stabilizing system comprises a plurality of bladders fluidly connected to each other in series.

4. The additive manufacturing apparatus of claim 1, wherein the stabilizing system comprises a plurality of bladders with each bladder being fluidly isolated from one another.

5. The additive manufacturing apparatus of claim 4, wherein each bladder is fluidly connected to a control system configured to independently control an amount of fluid within the bladder.

6. The additive manufacturing apparatus of claim 1, wherein the stabilizing system comprises a plurality of bladders, and wherein the build platform includes four corners, and wherein one bladder of the plurality of bladders is positioned under each corner of the build platform.

7. The additive manufacturing apparatus of claim 1, further comprising:
a machine frame, wherein the stabilizing system is positioned between the machine frame and the build platform.

8. The additive manufacturing apparatus of claim 7, wherein the build platform has a rectangular shape having four corners, and wherein at least one bladder of the stabilizing system is positioned under each corner of the build platform.

9. The additive manufacturing apparatus of claim 7, wherein the build platform has a rectangular shape having four sides, and wherein at least one bladder of the stabilizing system is positioned under each side of the build platform.

10. The additive manufacturing apparatus of claim 7, wherein the stabilizing system comprises a single bladder spanning an entire interface between the machine frame and the build platform.

11. The additive manufacturing apparatus of claim 1, further comprising:
a positioning system to which the build unit is attached, the positioning system adapted to move the build unit in at least three dimensions during operation.

12. The additive manufacturing apparatus of claim 1, wherein the build unit comprises a laminar gas flow zone.

13. The additive manufacturing apparatus of claim 1, wherein the build unit comprises a gasflow device with an outlet portion and an inlet portion providing a gas flow to a gas flow zone.

14. The additive manufacturing apparatus of claim 13, wherein the gasflow device is configured to remove an effluent plume via the outlet portion.

15. The additive manufacturing apparatus of claim 1, wherein the build unit comprises a recoater, the recoater comprising the recoater blade.

16. The additive manufacturing apparatus of claim 15, wherein the recoater includes a hopper comprising a back plate and a front plate.

17. A method for making an object from a powder, the method comprising:
(a) applying a layer of the powder on a build platform, wherein the build platform is positioned on a stabilizing system, wherein the stabilizing system includes a bladder containing a fluid therein;
(b) bonding at least part of a layer of the powder via an irradiation emission directing device of a build unit to form a portion of the object;
(c) moving at least one of the build platform downward or the build unit upward in a direction substantially normal to the layer of the powder, the build unit comprising a powder dispenser, a recoater blade, and an enclosure comprising the irradiation emission directing device and an inert environment, the inert environment of the enclosure being above a gas zone, the gas zone being between the enclosure and a work surface; and
(d) repeating at least steps (a) through (c) to form the object.

18. The method of claim 17, further comprising:
during at least one of steps (a) through (d), adjusting a volume of the fluid within the bladder.

19. The method of claim 17, wherein the bladder of the stabilizing system is a plurality of bladders, wherein the plurality of bladders are fluidly connected in series to one another.

20. The method of claim 17, wherein the bladder of the stabilizing system is a plurality of bladders, each bladder of the plurality of bladders being fluidly isolated from one another, and wherein the method further comprises:
during at least one of steps (a) through (d), independently adjusting a volume of the fluid within each bladder, wherein independently adjusting the volume of the fluid within each bladder is performed via a control system to keep the build platform level.

* * * * *